United States Patent
Tohki et al.

(10) Patent No.: US 10,630,850 B2
(45) Date of Patent: Apr. 21, 2020

(54) IMAGE FORMING APPARATUS

(75) Inventors: Shinsaku Tohki, Osaka (JP); Kumiko Ogino, Osaka (JP); Toshihiro Shoji, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 275 days.

(21) Appl. No.: 14/009,425

(22) PCT Filed: Apr. 25, 2012

(86) PCT No.: PCT/JP2012/061048
§ 371 (c)(1),
(2), (4) Date: Oct. 2, 2013

(87) PCT Pub. No.: WO2012/147770
PCT Pub. Date: Nov. 1, 2012

(65) Prior Publication Data
US 2014/0036279 A1     Feb. 6, 2014

(30) Foreign Application Priority Data
Apr. 28, 2011 (JP) ................. 2011-100713

(51) Int. Cl.
*H04N 1/00* (2006.01)
*G03G 15/00* (2006.01)

(52) U.S. Cl.
CPC ....... *H04N 1/00408* (2013.01); *G03G 15/502* (2013.01); *G03G 15/5095* (2013.01);
(Continued)

(58) Field of Classification Search
None
See application file for complete search history.

(56) References Cited

U.S. PATENT DOCUMENTS

2005/0100358 A1* 5/2005 Ushio ............... G03G 15/36
                                                        399/82
2006/0061805 A1* 3/2006 Kawamura ........ G06F 3/1205
                                                        358/1.15
(Continued)

FOREIGN PATENT DOCUMENTS

CN         1728005 A      2/2006
CN       101923438 A     12/2010
(Continued)

OTHER PUBLICATIONS

Tohki et al., "Image Forming Apparatus", U.S. Appl. No. 15/809,202, filed Nov. 10, 2017.

*Primary Examiner* — Fan Zhang
(74) *Attorney, Agent, or Firm* — Keating & Bennett, LLP

(57) ABSTRACT

An image forming apparatus includes: a document reading unit 110 allowing input of image data generated from a read document, a paper feed unit 140 containing recording paper, an image forming unit 120 forming an image on the recording paper based on the image data, and a touch-panel display 132 displaying a preview image representing a state of image formation. The touch-panel display displays a preview image in a designated orientation for a document of a prescribed size, and displays a preview image in accordance with size and orientation of recording paper fed from the paper feed unit, for a document not of the prescribed size. Thus, for documents of a prescribed size, preview images in a prescribed orientation can be displayed regardless of the direction of arrangement of the recording paper, and easier confirmation of expected finish of the formed image becomes possible.

7 Claims, 17 Drawing Sheets

(52) U.S. Cl.
CPC ..... *H04N 1/00411* (2013.01); *H04N 1/00456* (2013.01); *H04N 1/00474* (2013.01); *H04N 1/00482* (2013.01)

(56) References Cited

U.S. PATENT DOCUMENTS

| | | | |
|---|---|---|---|
| 2007/0025752 A1* | 2/2007 | Maeda et al. | 399/81 |
| 2007/0229915 A1 | 10/2007 | Iida | |
| 2008/0030818 A1* | 2/2008 | Nagahara | H04N 1/3873 358/537 |
| 2008/0225346 A1 | 9/2008 | Mano et al. | |
| 2008/0316526 A1* | 12/2008 | Matsuzaki et al. | 358/1.15 |
| 2009/0168081 A1* | 7/2009 | Takasaki | G06F 3/1207 358/1.2 |
| 2010/0107064 A1* | 4/2010 | Yamaguchi et al. | 715/274 |
| 2011/0129133 A1* | 6/2011 | Ramos | A61B 3/0041 382/128 |
| 2011/0216356 A1* | 9/2011 | Hiraki | G06K 15/10 358/1.15 |

FOREIGN PATENT DOCUMENTS

| | | | |
|---|---|---|---|
| JP | 2001-309115 A | | 11/2001 |
| JP | 2004-077616 A | | 3/2004 |
| JP | 2006084735 | * | 3/2006 |
| JP | 2006-202112 A | | 8/2006 |
| JP | 2006-221248 A | | 8/2006 |
| JP | 2007074540 | * | 3/2007 |
| JP | 2007-274077 A | | 10/2007 |
| JP | 2010-258706 A | | 11/2010 |

\* cited by examiner

FIG.4

| No. | DOCUMENT SETTING DIRECTION | RECORDING PAPER ARRANGEMENT DIRECTION | PREVIEW IMAGE |
|---|---|---|---|
| 1 | 910 | 932 | |
| 2 | 910 | 934 | 952 |
| 3 | 910 | 932 | |
| 4 | 910 | 934 | 952 |

FIG.12

| No. | DOCUMENT SETTING DIRECTION | RECORDING PAPER ARRANGEMENT DIRECTION | PREVIEW IMAGE |
|---|---|---|---|
| 1 | 910 | 932 | 280 |
| 2 | 910 | 934 | 280 |
| 3 | 910 | 932 | 280 |
| 4 | 910 | 934 | 280 |

FIG.15

| No. | DOCUMENT | 1ST TRAY (8.5X11) | 3RD TRAY (8.5X14) | PREVIEW IMAGE |
|---|---|---|---|---|
| 1 | ABC ... | ☐ | | ABC ... |
| 2 | DEF ... | | ☐ | DEF ... |
| 3 | GHI ... | ☐ | | GHI ... |
| 4 | JKL ... | ☐ | | JKL ... |
| 5 | MNO ... | ☐ | | MNO ... |
| 6 | PQR ... | | ☐ | PQR ... |

IMAGE FORMING APPARATUS

TECHNICAL FIELD

The present invention relates to an image forming apparatus having a preview function and, more specifically, to an image forming apparatus capable of displaying a preview image in an orientation allowing easy confirmation of displayed contents.

BACKGROUND ART

As one type of image processing apparatuses as electronic equipment, an image forming apparatus (typically a copy machine) for forming an image on a sheet of recording paper has been introduced to many places of business (companies and offices). A multi function peripheral (MFP) as one type of such image processing apparatuses has a plurality of operational modes including copy mode, facsimile mode (hereinafter facsimile is also denoted as FAX), network-supporting print mode and scanner mode.

A digital image forming apparatus has various and many image processing functions and it is capable of outputting image data (original document) input by a user in a desired form. By way of example, Japanese Patent Laying-Open No. 2001-309115 (hereinafter referred to as '115 Reference) discloses an image forming apparatus automatically rotating by 90° and printing image data generated by reading a document on a sheet of recording paper, even if a feeding direction of the set sheet of recording paper (conveying direction) is different from the orientation of the document. The image forming apparatus determines, from the size of set document and copy magnification, an appropriate size of a sheet of recording paper for forming an image, selects a sheet of recording paper of an appropriate size from among sheets of recording paper set in a paper feed unit, and rotates the orientation of the image to be aligned with the orientation of the sheet as needed. Thus, it is possible to form the document image on a sheet of recording paper without considering the state of recording paper (without changing and resetting the direction of recording paper).

In this image forming apparatus, however, how the document image is actually formed on the sheet of recording paper cannot be confirmed until after the document image is printed on a sheet and output from the image forming apparatus. Therefore, the document may be miscopied and the print may not be in a form desired by the user.

As a solution to this problem, an image forming apparatus having a preview function has been known, which utilizes an operation panel consisting of a display panel such as a liquid crystal display capable of displaying images and a touch-panel superposed on the top surface of the display panel. The preview function refers to a function of displaying an image representing a finished state (the final state of image that will be formed on a sheet of recording paper including post-processing such as binding or stapling) on the display panel, before actually forming the image on a sheet. By way of example, Japanese Patent Laying-Open No. 2004-77616 (hereinafter referred to as '616 Reference) discloses an image forming apparatus having a display/operating unit having a liquid crystal display screen. The image forming apparatus allows display of a print preview image on the liquid crystal display screen before actually copying, when an image is formed with its magnification changed. Thus, the user can confirm beforehand how the image will be recorded and reproduced on the sheet and give an instruction to output after it is confirmed that the image will be output in his/her desired form. Thus, misprinting can be reduced and waste of consumables recording paper, toner and the like) can be avoided.

A digital multifunctional peripheral provided with an ADF (Auto Document Feeder) as a device for automatically feeding documents to a document reading unit has also been widely used. By simply setting documents on the ADF, documents can automatically be fed to the document reading unit one by one and a large amount of original documents can be read with high efficiency.

SUMMARY OF INVENTION

Technical Problem

Conventional preview function, however, displays a preview image representing an output form based on the selected sheet of recording paper (size and orientation of the sheet). A preview display in an image forming apparatus provided with an ADF depends on a relation between the ADF and the direction of arrangement of sheets in the tray. Therefore, it is often the case that the preview image is displayed in a state rotated by 90° from the document orientation, making it difficult to confirm the finished state.

In the following, specific problems will be discussed. The terms related to the orientation of a document, recording paper and a preview image used in the specification are defined follows.

"Document direction" or "document orientation" refers to the direction in which the document is expected to be arranged when a user in front of the document views contents of the document (that is, with the document placed right in front of the user).

The document in a "lengthwise direction" or in "portrait orientation" means an arrangement in which the direction along the shorter side of the document (shorter side direction) extends to debt/left directions when the user in front of the document views contents of the document. Further, the document in a "widthwise direction" or in "landscape orientation" means an arrangement in which the direction along the longer side of the document (longer side direction) extends to right/left directions when the user in front of the document views contents of the document.

A sheet of recording paper is in a "lengthwise direction" or "portrait orientation" when the direction of feeding out the sheet from the tray (discharging direction) is parallel to the shorter side of the sheet. A sheet of recording paper is in a "widthwise direction" or "landscape orientation" when the discharging direction of the sheet is parallel to the longer side of the sheet.

A preview image is arranged in a "lengthwise direction" or "portrait orientation" when the shorter side direction of the image is parallel to the left/right direction of the display panel. A preview image is arranged in a "widthwise direction" or "landscape orientation" when the longer side direction of the image is parallel to the left/right direction of the display panel.

A document or a sheet of recording paper is conveyed in the image forming apparatus in a "lengthwise direction" or "portrait orientation" when the conveying direction is parallel to the shorter side of the document or sheet. A document or a sheet of recording paper is conveyed in the image forming apparatus in a "widthwise direction" or "landscape orientation" when the conveying direction is parallel to the longer side of the document or sheet.

The size of a document that can be fed by an ADF is limited and, particularly, the width of a document that can be fed is limited with respect to the direction orthogonal to the document feeding direction (hereinafter referred to as the orthogonal direction). This is because enlargement in the orthogonal direction with respect to the feeding direction leads to a larger size of the image forming apparatus and to a higher cost. For this reason, depending on the document size, the document feeding direction is limited, in an ADF of a common copying machine, sheets of B5, A4 and letter size (8.5×11) can be fed both in the lengthwise and widthwise directions. Sheets of B4, A3 and legal size (8.5×14), however, can be set only in such a manner that the shorter side of the document abuts an input portion of the ADF and, therefore, are always fed longitudinally.

Similarly, in order to prevent larger size and higher cost of an image forming apparatus, the direction of feeding sheets of recording paper as well as the direction of arranging sheets in a tray are also limited depending on the size of recording paper.

By way of example, assume that documents of letter size and legal size (see FIG. 1) are set in the ADF. A document 910 of letter size has the dimension of 8.5 inches×11 inches and the ADF can feed the document both in the lengthwise and widthwise directions. A document 900 of legal size, however, has the dimension of 8.5 inches×14 inches. Namely, though one side of the document 900 is of the same dimension as the letter size, the other side of the document 900 is longer than the letter size. Therefore, legal size document 900 must be placed in widthwise direction for feeding.

Assume that sheets of recording paper of letter size and legal size are set in a tray. As shown in FIG. 2, a tray 920 can contain only legal size sheets of recording paper 930 arranged horizontally. A first stopper 922 (solid line) holds the shorter side and a second stopper 924 (solid line) holds the longer side, of legal size recording paper 930. The feeding direction of recording paper (discharging direction) is as indicated by an arrow 940. On the other hand, tray 920 can contain both letter size sheets of recording paper 932 arranged horizontally and letter size sheets of recording paper 934 arranged vertically. For letter size recording paper 932, the first stopper 922 slid to the position indicated by a dotted line holds the shorter side direction and the second stopper 924 holds the longer side direction. For letter size recording paper 934, the first stopper 922 slid to the position indicated by a dashed line holds the shorter side direction and the second stopper 924 slid to the position indicated by a dashed line holds the longer side direction. Typically, when a letter size sheet of recording paper is arranged vertically, it is indicated as "8.5×11" and when arranged horizontally, it is indicated as "8.5×11R."

As described above, for a legal size document, the recording paper is also set horizontally and, therefore, by a function of automatically selecting the size of recording paper corresponding to the document size, a sheet of recording paper of legal size (arranged horizontally) is selected and a preview image is displayed in a landscape orientation. Approximately 80% of legal size documents are in portrait orientation (see FIG. 1). Therefore when a preview image of legal size is displayed as a landscape image, it is highly likely that the display is rotated by 90° from the actual document orientation. FIG. 3 shows this state. On the left end of FIG. 3, the positional relation between ADF 926 and legal size document 900 is shown. Specifically, legal size document 900 is set abutting ADF 926, and fed in a direction indicated by an arrow 942. At the center of FIG. 3, legal size recording paper 930 is shown, fed in the direction of an arrow 940. On the right end of FIG. 3, a preview image 950 displayed on a display screen is shown. In this manner, legal size document 900 in portrait orientation is displayed as a preview image 944 rotated by 90° from the original document orientation. Thus, it is difficult for the user to confirm the state of output.

In contrast, approximately 80% of letter size documents are in landscape orientation (see FIG. 1). For letter size, setting in the ADF in two directions and arrangement in the tray in two directions are possible. Therefore, depending on the direction of setting the document in the ADF and the direction of arrangement of sheets in the tray, it is possible that a displayed image is rotated by 90° from the actual document orientation. FIG. 4 shows an example of copying the letter size document shown in FIG. 1. In FIG. 4, meanings of the images on the left end, at the center and on the right end are the same as those of FIG. 3. The feeding directions of document and recording paper are also the same as in FIG. 3. In Examples No. 1 and No. 3 of FIG. 4, the preview images are displayed in the same orientation as the letter size document, and the user can easily confirm the state of output. In the Examples No. 2 and No. 4 of FIG. 4, however, preview images 952 are displayed rotated by 90° from the actual document orientation and the user cannot easily confirm the state of output.

As described above, there is a problem that state of output from an image forming apparatus cannot be easily confirmed when the preview is displayed rotated by 90° from the actual document orientation, Particularly, if a plurality of documents (including documents of different sizes mixed) are copied and preview images are displayed in orientations different from the document orientations, it would be much burdensome for the user.

The problem cannot be solved by the inventions disclosed in '115 and '616 References mentioned above. We cannot find any specific description related to the orientations of documents and recording paper in '616 Reference.

Therefore, an object of the present invention is to provide an image forming apparatus capable of displaying a preview image in a prescribed direction, regardless of the direction of arrangement of recording paper in a tray with respect to a document of a prescribed size, so as to enable smooth confirmation by the user of the contents of output images.

Solution to Problem

According to a first aspect, the present invention provides an image forming apparatus, including: an image input unit allowing input of image data generated by reading a document; a paper feed unit containing recording paper to be fed for image formation; an image forming unit forming an output image based on the image data on the recording paper fed from the paper feed unit; a preview image generating unit generating a preview image representing an expected state of the recording paper when the output image is formed, from the image data; and a display unit displaying the preview image. The display unit displays the preview image in a first display mode of displaying the preview image in accordance with size and orientation of recording paper fed from the paper feed unit for forming the output image, or in a second display mode of displaying the preview image in accordance with size of the document.

Preferably, the image forming apparatus further includes a size detection unit detecting the size of the document, and the display unit displays the preview image in the second display mode if the size of the document detected by the size detection unit falls within a prescribed size, and displays the preview image in the first display mode if the size of the document detected by the size detection unit does not fall within the prescribed size.

More preferably, the image input unit reads the document and generates the image data; the size detection unit detects length and width of the document read by the image input unit; the prescribed size is a first value or a second value not larger than the first value; and the display unit displays the preview image in the second display mode if difference between the length and the first value and difference between the width and the second value are within a prescribed range, and displays the preview image in the first display mode if at least one of the difference between the length and the first value and the difference between the width and the second value exceeds the prescribed range.

According to a second aspect, the present invention provides an image forming apparatus receiving an input image data generated by reading a document and displaying a preview image representing an expected state of recording paper when an output image based on the image data is formed on the recording paper. In the image forming apparatus, if the image data is generated by reading the document of a prescribed size, the preview image is displayed in accordance with the size of the document; and if the image data is generated by reading the document of a size other than the prescribed size, the preview image is displayed in accordance with size and orientation of recording paper for forming the output image.

According to a third aspect, the present invention provides an image forming apparatus, including: a paper feed unit containing a plurality of different types of recording paper of different sizes to be fed for image formation; an image input unit allowing input of image data generated by reading a document; a selecting unit selecting, based on size of the document, recording paper for forming an output image based on the image data from among the plurality of different types of recording paper contained in the paper feed unit; and a display unit displaying a preview image representing an expected state of the recording paper when the output image is formed. If the image data is generated by reading the document of a prescribed size, the display unit displays the preview image in accordance with the size of the document, and if the image data is generated by reading the document of a size other than the prescribed size, the display unit displays the preview image in accordance with size and orientation of the selected recording paper.

Advantageous Effects of Invention

According to the present invention, the image forming apparatus is capable of displaying a preview image in a prescribed direction, regardless of the direction of arrangement of recording paper in a tray with respect to a document of a prescribed size. Therefore, the user can smoothly confirm the finish of formed image (contents of output image). Particularly, when a plurality of documents of different sizes mixed are scanned, it is possible for the user to efficiently confirm the finished state.

Further, it is possible to designate at will a document as an object of preview display in accordance with the document size and, therefore, if documents of a specific size are frequently found to be in a specific orientation, it is possible to display preview images in the frequently assumed orientation. By way of example, approximately 80% of letter size documents are in landscape orientation while approximately 80% of legal size documents are in portrait orientation. Therefore, by setting preview images to be displayed in respective orientations for the documents of these sizes, it becomes easier for the user to confirm the finished state.

Further, since the preview image can be rotated, if a preview image is displayed in an orientation different from the document orientation, the preview image can be rotated to be the same orientation as the document. Thus, the user can efficiently confirm the finished state.

BRIEF DESCRIPTION OF DRAWINGS

FIG. 4 shows a relation between each of the direction of setting a document, the direction of recording paper and the direction of preview image, when a letter size document is to be copied.

FIG. 12 shows a relation between each of the direction of setting a document, the direction of recording paper and the direction of preview image, when a letter size document is to be copied by the image forming apparatus shown in FIG. 5.

FIG. 15 shows a relation between each of the direction of setting a document, the direction of recording paper and the direction of preview image, when documents of different sizes mixed are copied by the image forming apparatus shown in FIG. 5.

DESCRIPTION OF EMBODIMENTS

Figure 1:
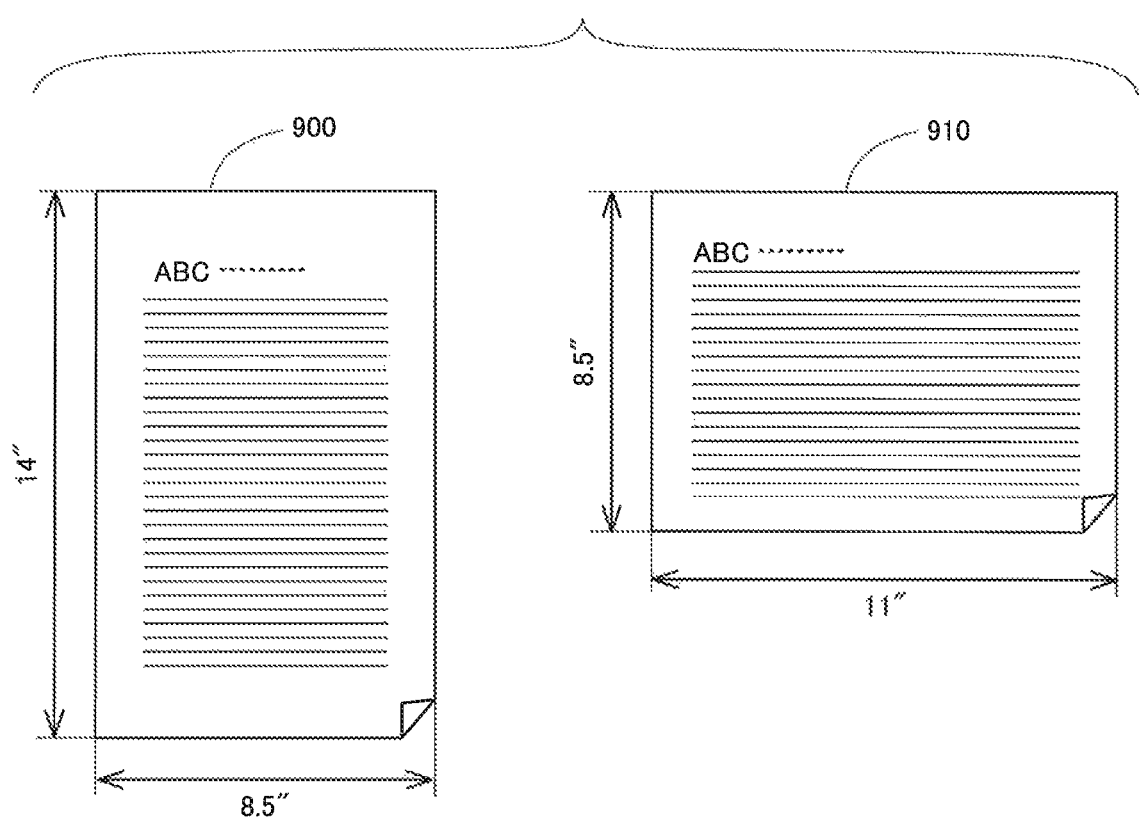
FIG. 1 is shows legal size and letter size documents.
Figure 2:
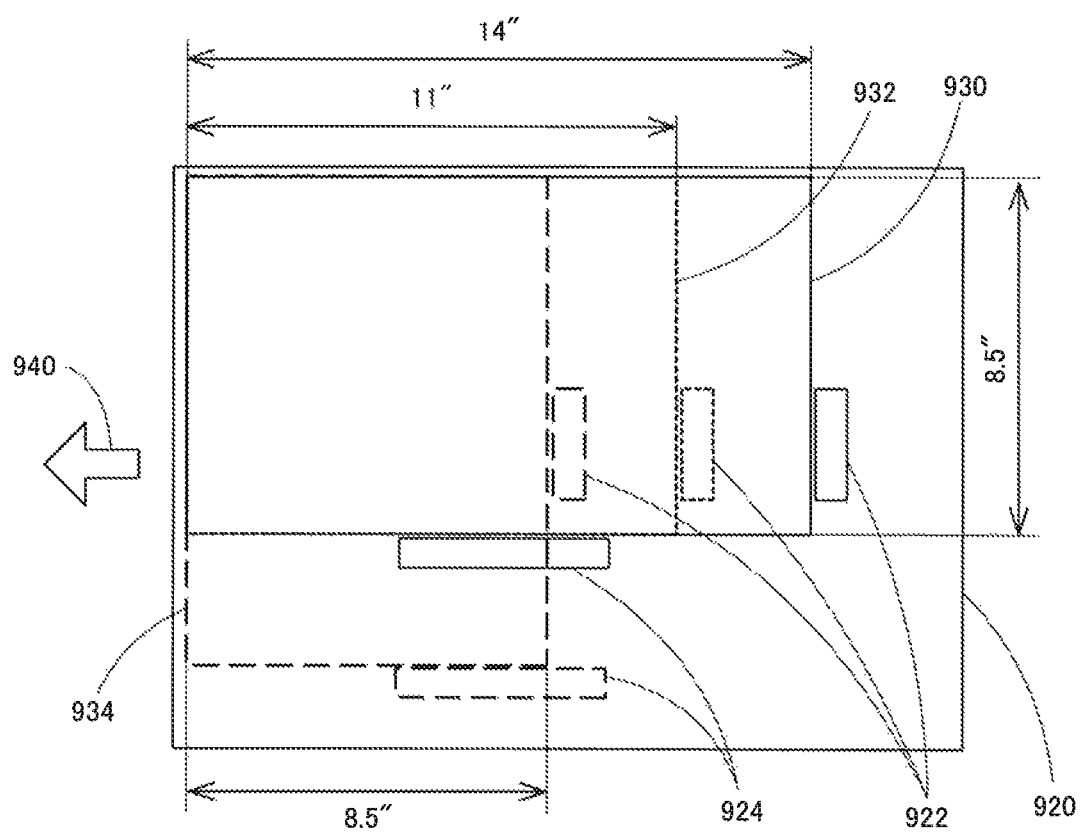
FIG. 2 is a plan view showing arrangements of recording paper in a tray of an image forming apparatus.

In the following embodiments, the same components are denoted by the same reference characters. Their names and functions are also the same. Therefore, detailed descriptions thereof will not be repeated.

The image forming apparatus in accordance with an embodiment of the present invention reads a document and provides a preview display. The image forming apparatus forms an image on a sheet of recording paper utilizing electrophotography. The image forming apparatus is a multifunction peripheral having copy mode, printer mode, scanner mode, facsimile mode and the like as its operational modes.

Figure 5:
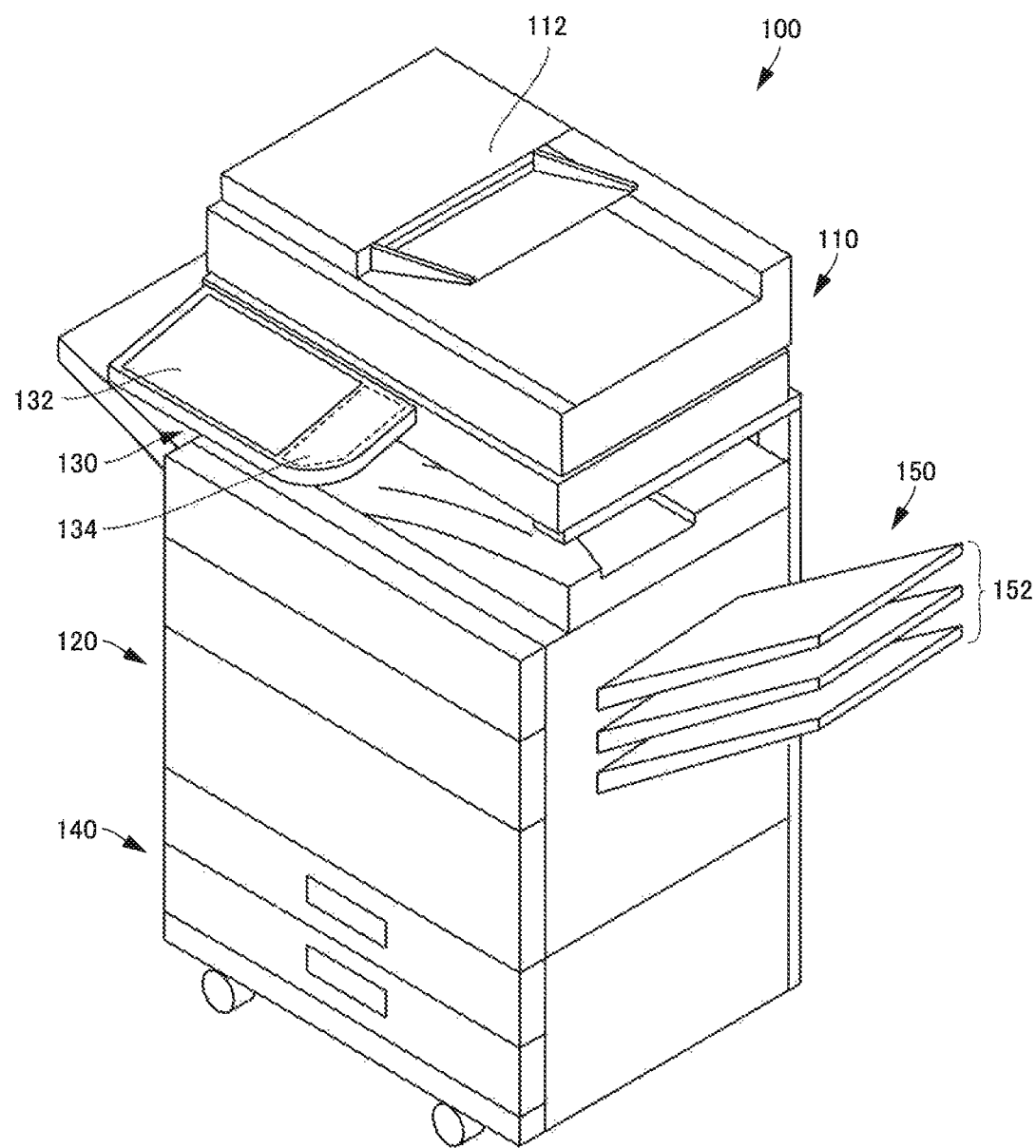
FIG. 5 is a perspective view showing an appearance of the image forming apparatus in accordance with an embodiment of the present invention.
Figure 6:
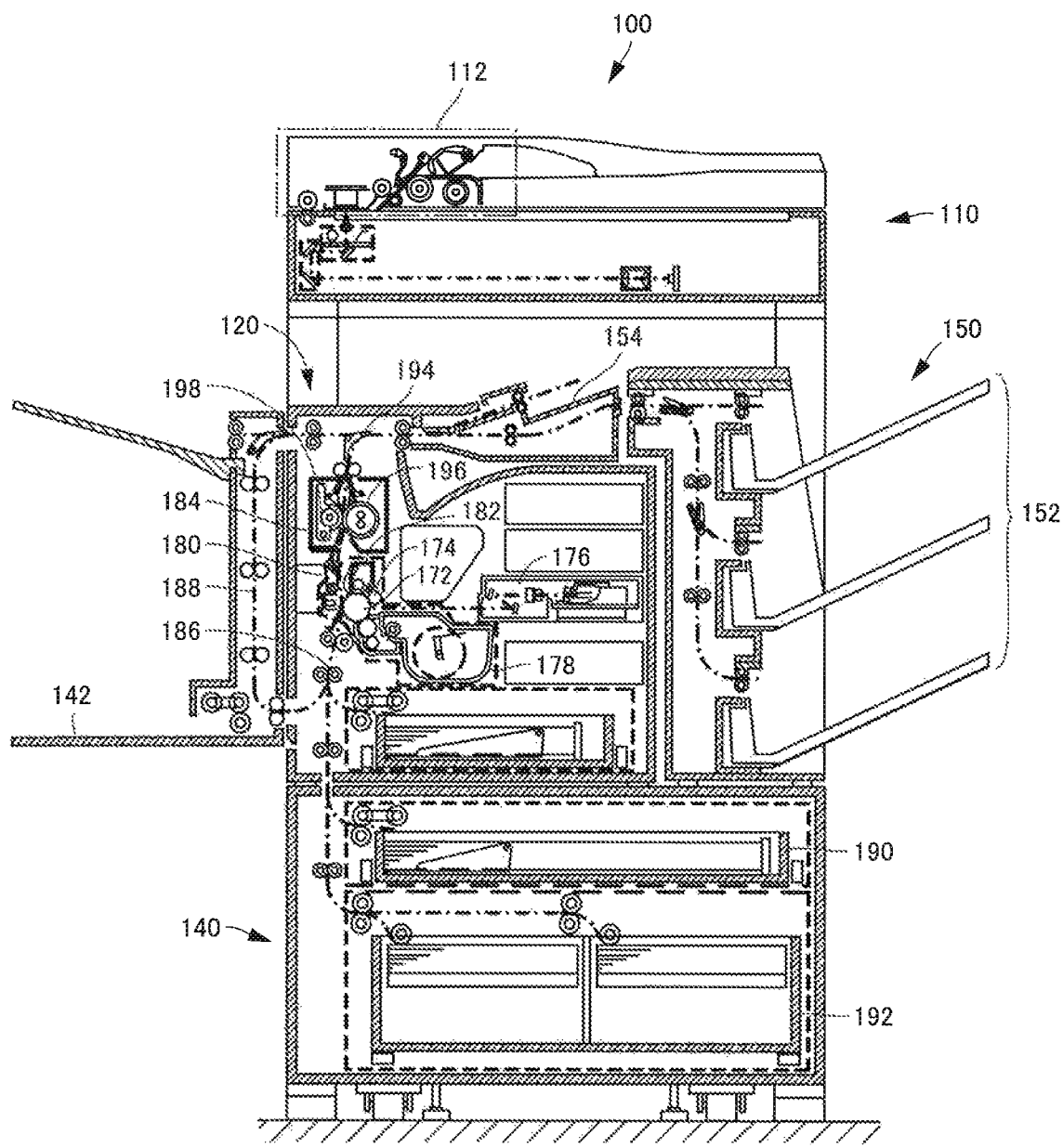
FIG. 6 is a cross-sectional view schematically showing an internal configuration of the image forming apparatus shown in FIG. 5.

Referring to FIGS. 5 and 6, the image forming apparatus 100 includes a document reading unit 110, an image forming unit 120, an operation unit 130, a paper feed unit 140, and a paper discharge unit 150. Document reading unit 110 is provided with an ADF 112 for automatically feeding a document. Operation unit 130 is provided with a touch-panel display 132 and an operation key unit 134. Touch-panel display 132 includes a display panel implemented, for example, by a liquid crystal panel, and a touch-panel placed on the display panel, for detecting a touched position. On operation key unit 134, a few function keys, not shown, are arranged.

Figure 7:
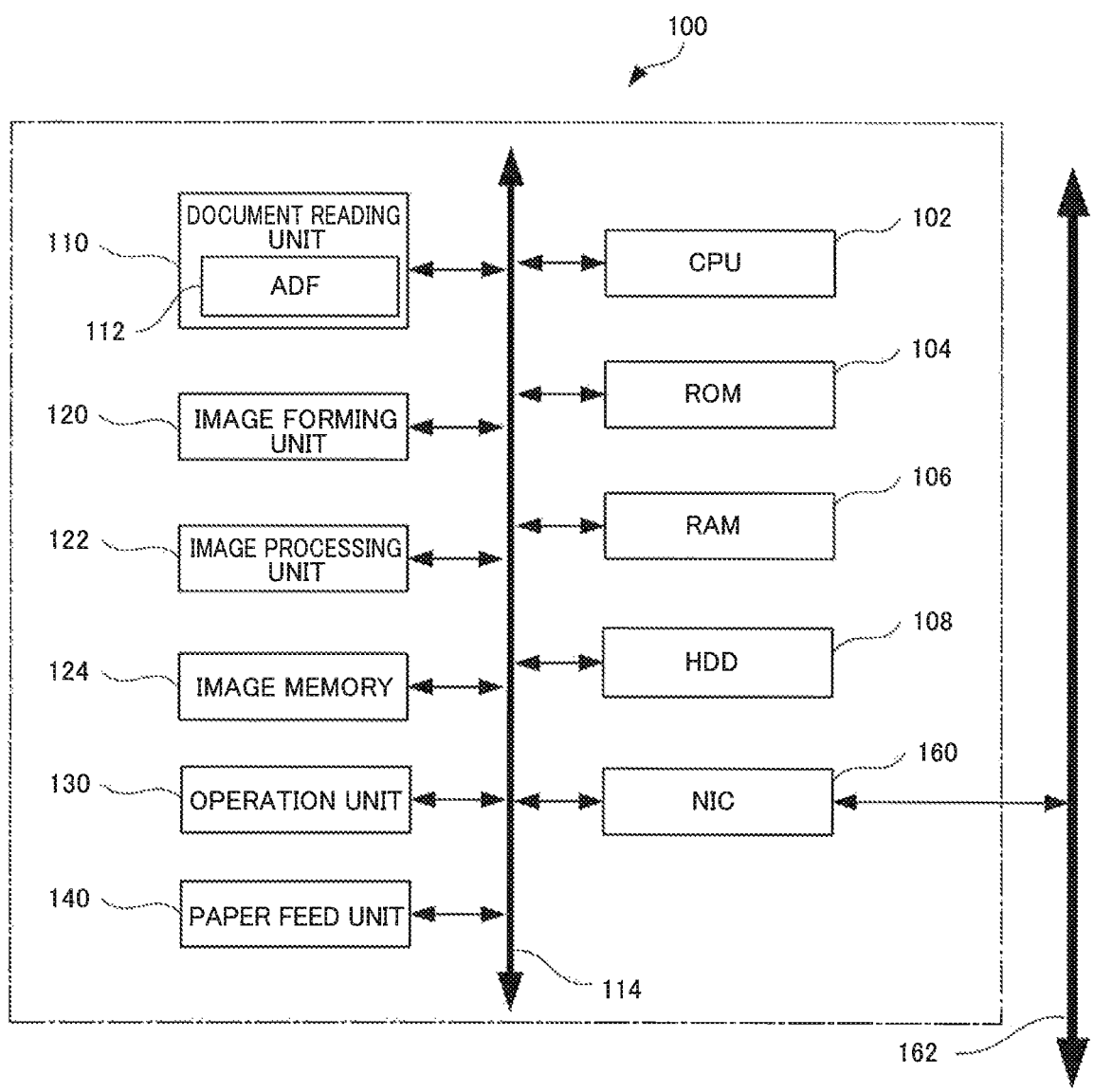
FIG. 7 is a functional block diagram showing a hardware configuration of the image forming apparatus shown in FIG. 5.

Referring to FIG. 7, image forming apparatus 100 includes: a control unit (hereinafter referred to as a CPU) 102 for overall control of image forming apparatus 100; an ROM (Read Only Memory) 104 for storing programs and the like; an RAM (Random Access Memory) 106 as a volatile storage device; and an HDD (Hard Disk Drive) 108 as a non-volatile storage device that retains data even when power is turned off. ROM 104 stores programs and data necessary for controlling operations of image forming apparatus 100.

Image forming apparatus 100 further includes an image processing unit 122, an image memory 124, on NIC (Network Interface Card) 160 and a bus 114. CPU 102, ROM 104, RAM 106, HDD 108, NIC 160, document reading unit 110, image forming unit 120, image processing unit 122, image memory 124, operation unit 130 and paper feed unit 140 are connected to bus 114, Data exchange (including control information) between each of these units and components is done through bus 114. CPU 102 reads a program from ROM 104 to RAM 106 through bus 114, and executes the program using apart of RAM 106 as a work area. Specifically. CPU 102 controls various units and portions forming image forming apparatus 100 in accordance with the programs stored in ROM 104 and realizes various functions of image forming apparatus 100.

NIC 160 is an interface connected to an external network 162, to enable communication of image forming apparatus 100 with an external device through network 162. Image forming apparatus 100 includes a FAX modem (not shown) as an interface enabling FAX communication between image forming apparatus 100 and an external device through a telephone network.

Document reading unit 110 includes a CCD (Charge Coupled Device) for reading an image, and a document detection sensor for detecting a document set on ADF 112, and it reads the document and inputs image data. The image data is temporarily stored in image memory 124. Image processing unit 122 executes various image processing operations on the read image data. Image forming unit 120 prints image data on a sheet of recording paper. Image data is stored in HDD 108 as needed.

Operation unit 130 receives inputs such as an instruction by the user to image forming apparatus 100. The user confirms the state and job processing status of image forming apparatus 100, by the screen images displayed on touch-panel display 132. The user can set functions and instruct operations of image forming apparatus 100 by selecting keys displayed on touch-panel display 132 on the touch-panel superposed on the display panel (by touching the corresponding portions on the touch-panel).

CPU 102 monitors the user operation on touch-panel display 132, input keys and the like provided on operation unit 130, and displays pieces of information to be notified to the user, such as the information of the state of image forming apparatus 100, on touch-panel display 132.

In the following, each of the operational modes of image forming apparatus 100 will be briefly described.

(Copy Mode)

In the copy mode, document reading unit 110 and image forming unit 120 mainly operate. When image forming apparatus 100 is used as a copy machine, image data of the document read by document reading unit 110 is output as a copy from image forming unit 120.

By the CCD provided at document reading unit 110, images of the document set at a reading position can be electronically read. The read image data is completed as output data (print data) on image memory 124, and stored in HDD 108. If there is a plurality of documents, the reading and storage operations are repeated. Thereafter, based on the process mode instructed from operation unit 130, the image data stored in HDD 108 is successively read at appropriate timing and transmitted to image memory 124. Then, the image data is transmitted to image forming unit 120 timed with image formation at image forming unit 120.

When the read image is to be printed on a plurality of pages, the image data is stored page by page as output data in the similar manner in HDD 108, transmitted from HDD 108 to image memory 124, and transmitted to image forming unit 120 timed with image formation, repeatedly for the number of pages to be output.

Referring to FIG. 6, image forming unit 120 prints image data of a document on a recording medium (in most cases, recording paper). Image forming unit 120 includes a photoreceptor drum 172, a charger 174, a laser scanning unit 176, a developer 178, a transfer device 180, a cleaning device 182, a fixing device 184 as a heating and fixing unit, and a neutralizer, not shown.

In image forming unit 120, a main feeding path 186 and a reverse feeding path 188 are provided, and a sheet of recording paper fed from paper feed unit 140 is fed along main feeding path 186. Paper feed unit 140 draws out sheets of recording paper stacked on tray 190 or 192 or on a manual feed tray 142 one by one by a pick-up roller, and feeds the sheet of paper to main feeding path 186 of image forming unit 120.

While the sheet of recording paper is fed along main feeding path 186 of image forming unit 120, the sheet passes between photoreceptor drum 172 and transfer device 180, and further passes through fixing device 184, whereby printing is done on the sheet of recording paper.

Photoreceptor drum 172 rotates in one direction, and its surface is cleaned by cleaning device 182 and the neutralizer and, thereafter, uniformly charged by charger 174.

Laser scanning unit 176 modulates the laser beam based on the image data to be printed, and repeatedly scans the surface of photoreceptor drum 172 with the modulated laser beam in a main scanning direction, whereby an electrostatic latent image is formed on the surface of photoreceptor drum 172.

Developer 178 develops the electrostatic latent image by supplying toner to the surface of photoreceptor drum 172, and thus, a toner image is formed on the surface of photoreceptor drum 172.

Transfer device 180 transfers the toner image on the surface of photoreceptor drum 172 to the sheet of recording paper passing between transfer device 180 and the photoreceptor drum 172.

Fixing device 184 includes a heating roller 196 for heating the sheet of recording paper and a pressure roller 198 for pressing the sheet of recording paper. As the sheet of recording paper is heated by heating roller 196 and pressed by pressure roller 198, the toner image that has been transferred to the sheet of recording paper is fixed on the sheet.

At a position of connection between main feeding path 186 and reverse feeding path 188, a separation pawl 194 is arranged. When printing is done only on one side of the sheet of recording paper, separation pawl 194 is so positioned that the sheet of recording paper fed from fixing device 184 is guided to paper discharge tray 154 or a paper discharge unit 150.

When printing is done on both sides of the sheet of recording paper, separation pawl 194 is turned to a prescribed direction, so that the sheet of recording paper is guided to reverse feeding path 188. The sheet of recording paper passes through reverse feeding path 188, turned upside-down and again fed to main feeding path 186, and while it is again fed along main feeding path 186, printing is done on its rear surface, and thereafter the sheet is guided to paper discharge tray 154 or to paper discharge unit 150.

The sheet of recording paper printed in the above-described manner is guided to paper discharge tray 154 or to any of paper discharge trays 152 of paper discharge unit 150.

Paper discharge unit 150 may perform a process of sorting a plurality of printed sheets of paper to be output to different discharge trays 152, a process of punching each sheet of recording paper or a process of stapling the sheets of recording paper. Assume that a number of copies of the printing are to be prepared. In that case, sheets of recording paper are sorted and discharged to paper discharge trays 152 such that each tray 152 contains each set of printed sheets, and the set of printed sheets in each tray 152 is stapled or punched and copies of printing are prepared.

(Printer Mode)

When image forming apparatus 100 is used as a printer, image data received through NIC 160 is output from image forming unit 120 through image memory 124 and the like.

NIC 160 receives image data from a computer or the like connected to network 162. The received image data is transmitted page by page as output image data to image memory 124, and stored in HDD 108. Thereafter, the image data is again transmitted from HDD 108 to image memory 124, and transmitted to image forming unit 120 as in the copy mode described above, and image formation takes place.

(Scanner Mode)

When image forming apparatus 100 is used, for example, as a network scanner, image data of the document read at document reading unit 110 is transmitted from NIC 160 through network 162 to a computer or the like. Here again, the document is electronically read by the CCD provided at document reading unit 110. The read image data of the document is completed as output data on image memory 124, and stored in HDD 108. Thereafter, the image data is again transmitted from HDD 108 to image memory 124, and after communication with a transmission destination designated through operation unit 130 is established, transmitted from NIC 160 to the designated transmission destination.

(Facsimile Mode)

Image forming apparatus 100 can transmit/receive FAX to and from an external facsimile device through a FAX modem and a public telephone line.

When used as a facsimile machine, image processing apparatus 100 is capable of forming image data from the data received through FAX from a facsimile machine on image memory 124 and, in the similar manner as described above, storing the image data in HDD 108 and executing printing using image forming unit 120. Further, image forming apparatus 100 is capable of reading image data from HDD 108, converting the data to a data format for FAX transmission, and transmitting to an external facsimile machine through a FAX modem and a public telephone line.

The above-described various operational modes of image forming apparatus 100 are selected by the user through operation unit 130, and settings related to various operational modes are also done through operation unit 130. When a setting related to an operational mode is done by a user, an image formation is instructed through operation unit 130. In the following, display on touch-panel display 132 will be described.

Figure 8:
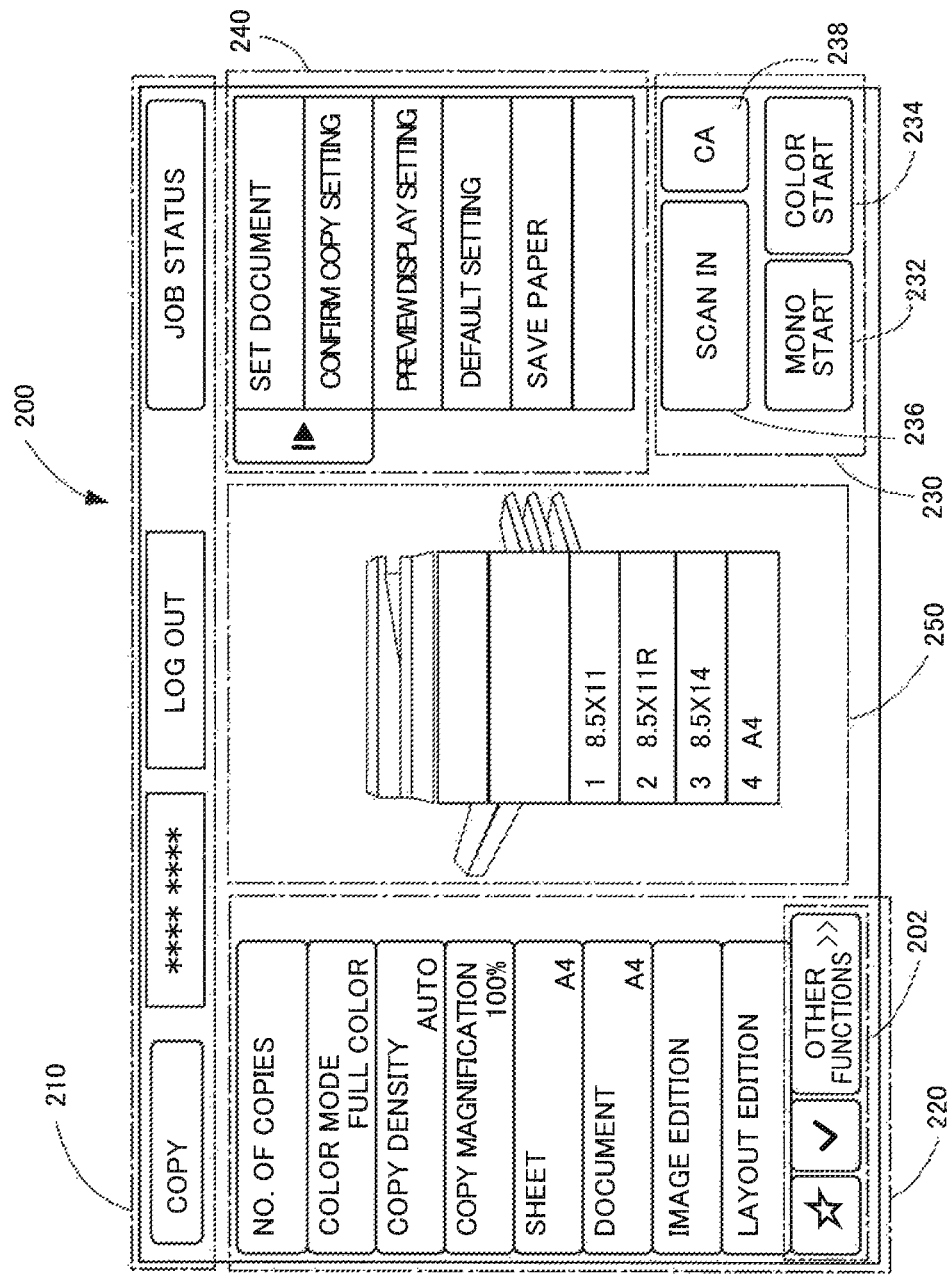
FIG. 8 shows a display screen of the image forming apparatus shown in FIG. 5.

FIG. 8 shows a screen image 200 on touch-panel display 132 of image forming apparatus 100. Referring to FIG. 8, a basic layout of touch-panel display 132 of landscape layout (for example, width of 1024 pixels×length of 600 pixels) includes: a system area 210 at the uppermost portion; a function selecting area 220 on the left side; a preview area 250 at the center; and a task trigger area 230 and an action panel area 240 on the right side. The method and layout of dividing the screen image displayed on touch-panel display 132 are not limited to the above. Custom-change may be made possible for easier operation by the user. By way of example, system area 210 may be positioned at the lowermost position of the screen image.

It is possible for the user to set functions and instruct operations of image forming apparatus 100 by selecting keys displayed on screen image 200 of touch-panel display 132 (by touching corresponding portions on the touch-panel). Whether or not a displayed key is pressed on touch-panel display 132 may be determined using a known technique. By way of example, correspondence relation between two-dimensional coordinates of the touch-panel and two-dimensional coordinates of the display panel is determined beforehand, and whether or not a pressed position on the touch-panel is within a region of a character, figure or the like displayed on the display panel may be determined, to detect a character, a figure or the like selected by the user.

Preview area 250 is an area on which a preview image is displayed, as will be described later. For instance, if a document is read as an image and copying is to be executed, a preview image in accordance with settings is displayed on touch-panel display 132. Since the preview image is displayed, the user can more accurately grasp the expected finished state, and hence, the copy process can be executed without error. On screen image 200 before reading a document, an image schematically showing image forming apparatus 100 is displayed on preview area 250. At positions representing respective trays of paper feed unit 140, types of recording paper set therein are displayed such that the direction of arrangement is recognizable.

System area 210 displays information related to image forming apparatus 100 at present, that is, information related to the title of operational mode currently in progress and the state of image forming apparatus 100. By way of example, on system area 210, the name of operational mode, an interruption key, a logged-in user name, status of job that is being processed, state of use of an internal memory, time and the like are displayed. FIG. 8 shows some of these pieces of information.

On function selecting area 220, a function selection menu (icons, keys and the like) operated by the user for setting various functions, switching displays and confirming settings is displayed. Below function selecting area 220, a group of changing keys 202 for changing a display style of function selecting area 220 is provided. The group of changing keys 202 includes a key (left-end key) for displaying function selecting area 220 in an icon mode, a key (central key) for displaying functions registered as "favorites", and a key (right-end key) for displaying a list of functions available in the currently selected operational mode. The icon mode represents a mode in which only the icons for setting functions are displayed on function selecting area 220 and function selecting area 220 is displayed narrow, to maximize preview area 250.

If much information is to be displayed on function selecting area 220, pieces of information are displayed in upward/downward scrollable manner on function selecting area 220. Here, the group of changing keys 202 is not scrolled but kept constantly at the lowermost portion of function selecting area 220.

On task trigger area 230, a trigger key, which is operated by the user for actually operating image forming apparatus 100 after all settings in a specific operational mode are completed, is displayed. In the present embodiment, task trigger area 230 includes a monochrome start key 232, a color start key 234, a scan-in key 236 and a clear all (CA) key 238. Monochrome start key 232 is for starting monochrome copying of a document. Color start key 234 is for starting color copying of a document. Scan-in key 236 is a key for starting an operation of once scanning a document and storing it as an image in image forming apparatus 100. Clear all key 238 is for clearing all settings.

It is preferable to display, only when a job to be triggered is ready, a start key as the trigger of the job, rather than constantly displaying the trigger key. The job is ready when, in an operational mode involving printing, all settings are completed and consumables (including recording paper and toner) are not running out. In a facsimile mode (transmission) as an operational mode not involving printing, the job is ready when settings of all transmission parameters including a destination address are completed.

On action panel area 240, information related to assistance, advice and suggestion to operations is displayed. By way of example, assuming that a user selects a specific function, on action panel area 240, a function related to the selected function may be displayed, a function associated with the selected function in an object-oriented manner may be displayed, or a function selected in the past in combination with the selected function by the user or a user of a group to which the user belongs may be displayed as a "recommended function."

In the following, the preview function of image forming apparatus 100 will be described. Image forming apparatus 100 has two preview display modes. One is a "selected sheet priority display mode" in which a preview image is formed in accordance with a direction of recording paper (hereinafter also referred to as a sheet) selected through touch-panel display 132. The other is an "input image priority display mode" in which a preview image is displayed in accordance with the document size. These modes are set, for example, by a screen image of FIG. 9 (preview display mode setting screen image) 260.

Figure 9:
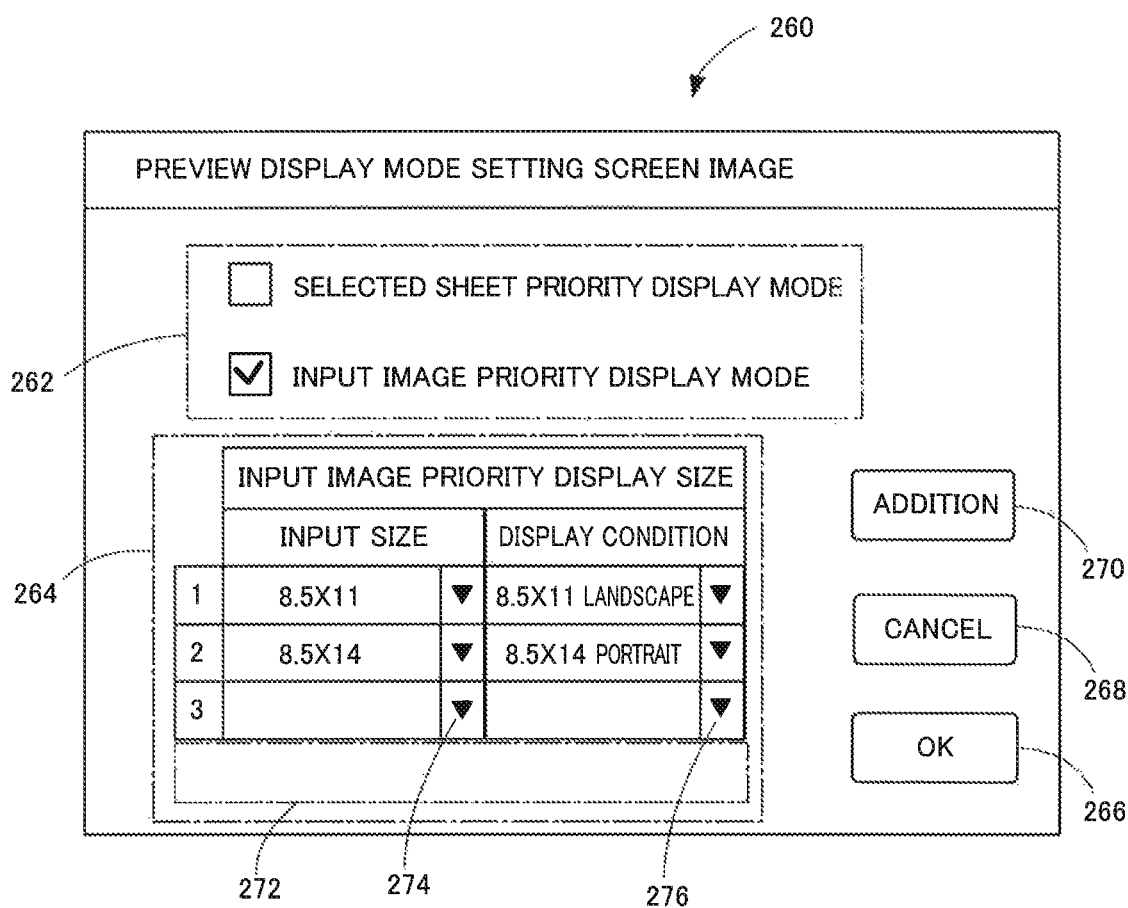
FIG. 9 shows a screen image for setting a preview display mode.

Screen image 260 is displayed when a "preview display setting" key on action panel area 240 is touched, on screen image 200 (FIG. 8) on touch-panel display 132. By touching a check box of mode selecting area 262 of screen image 260, the "selected sheet priority display mode" or the "input image priority display mode" is selected. FIG. 9 shows a state in which the "input image priority display mode" is set.

A document designating area 264 is an area for setting the type of document to which the "input image priority display mode" is applied. Setting of document designating area 264 is valid if the "input image priority display mode" is selected. The column of input size represents the type of document to which the "input image priority display mode" is applied. The column of display conditions represents size and orientation of the preview image. The setting on the first row represents that if the document is of the letter size (8.5×11), a preview image in landscape orientation is displayed. The setting on the second row represents that if the document is of the legal size (8.5×14), a preview image in portrait orientation is displayed. When an addition key 270 is touched, a blank row is newly added to an additional area 272. FIG. 9 shows a state after addition key 270 is touched and a blank row is displayed as the third row. The input size and the display condition are set, for example, by the user touching pull-down keys 274 and 276 and selecting one option from among displayed options. When an OK key 266 is touched, contents displayed at that time are stored as new conditions for preview display in HDD 108, screen image 260 is erased and screen image 200 (FIG. 8) is displayed. When a cancel key 268 is touched, the displayed contents are discarded, screen image 260 is erased and screen image 200 is displayed.

The conditions of preview display set in the above-described manner may be stored in any form in HDD 108. For example, data of 1 bit may be stored as the setting information of the preview display mode (for example, "0" corresponds to the "selected sheet priority display mode" and "1" corresponds to the "input image priority display mode"). The setting information of input size and the setting information of display conditions are stored in corresponding manner. As the setting information of input size, for example, lengths of two sides are stored. As the setting information of display conditions, for example, information of lengths of two sides as well as the information of orientation are stored in corresponding manner. For instance, if the input size is letter size (8.5×11), numerical values (215.9, 279.4) representing the lengths of two sides in centimeters are stored. If the input size is legal size, numerical values (215.9, 355.6) are stored in the similar manner. The same applies to the "size" of display conditions. For the "orientation" of display conditions, data of 1 bit (for example, "0" corresponds to the landscape and "1" corresponds to portrait orientation) is stored.

Since types (sizes) of commonly used recording paper are limited and, therefore, the types and sizes of recording paper may be stored in corresponding manner in the form of a table, and information specifying the type of recording paper may be stored as the setting information of input size. Similarly, for the information of "size" of display conditions, the information specifying the type of recording paper in the table may be stored, in this manner, options to be displayed when pull-down keys 274 and 276 are touched may be generated by looking up the table.

In the following, a control structure of a computer program displaying a preview image in accordance with the settings of preview display mode above will be described.

Here, it is assumed that a preview image is set to be displayed when a document is scanned, conditions for preview display are set as shown in FIG. 9, and that a legal size or letter size document is copied. It is assumed that in the first tray, letter size sheets of recording paper are arranged in lengthwise direction (8.5×11), in the second tray, letter size sheets of recording paper are arranged in widthwise direction (8.5×11R), and in the third tray, legal size sheets of recording paper are arranged in lengthwise direction (8.5×14), as shown in FIG. 8. Further, it is assumed that screen image 200 of FIG. 8 is displayed on touch-panel display 132.

Figure 10:
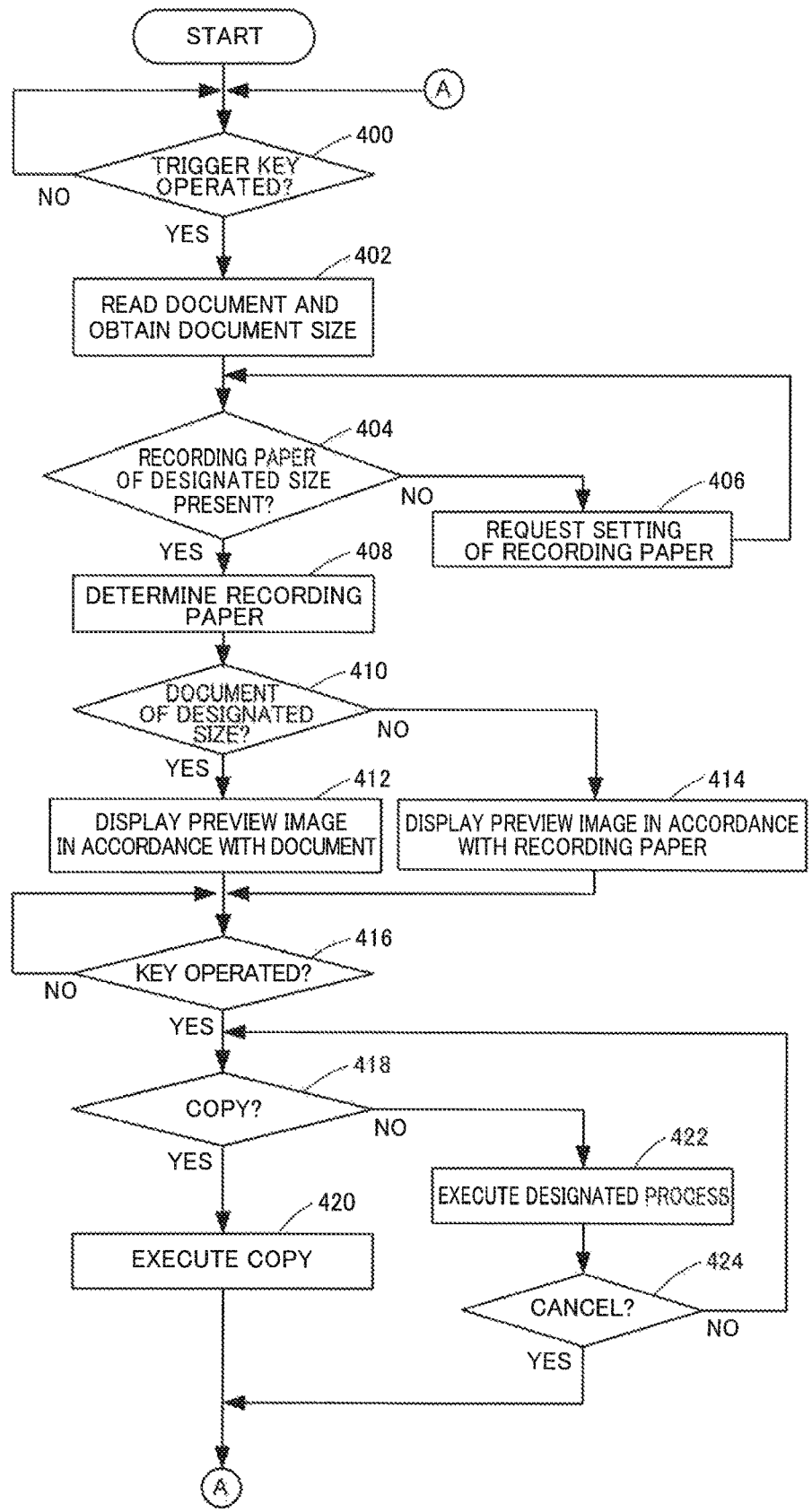
FIG. 10 is a flowchart representing a control structure of a computer program realizing the preview function.

Referring to FIG. 10, at step 400, CPU 102 determines whether or not a trigger key other than clear all key 238 is touched. If it is determined that a trigger key other than clear all key 238 is touched, the flow proceeds to step 402, and otherwise, the process of step 400 is repeated. Here, an example of copying a document is described and, therefore, monochrome start key 232, color start key 234 or scan-in key 236 is pressed and the flow proceeds to step 402.

At step 402. CPU 102 operates ADF 112 to feed a document on a platen to document reading unit 110, where the document is scanned and image data is stored. At this time, CPU 102 detects width and length of the document by means of the document detection sensor, and thus obtains the document size. The document detection sensor may be a sensor arranged at a document set position of the platen, a sensor detecting the document size based on the passage time of conveyed document or the like. The document size may also be obtained from image data read by the CCD. Here, the document size is detected to be the legal size or letter size.

At step 404, CPU 102 determines whether or not recording paper corresponding to the document size determined at step 402 or recording paper designated by the user is set in any tray of paper feed unit 140. If the document size is legal size, CPU 102 determines whether or not recording paper of legal size is set. If the document size is letter size, CPU 102 determines whether or not recording paper of letter size is set. Information related to the recording paper set in the trays of paper feed unit 140 is stored in advance in HDD 108 and also displayed in the user-recognizable manner on the preview area 250 of FIG. 8, as described above. The recording paper designated by the user is displayed on a "paper" key of function selecting area 220 of screen image 200 shown in FIG. 8. If it is determined that appropriate recording paper exists, the control proceeds to step 408. Otherwise, the control proceeds to step 406, at which CPU 102 displays a message urging setting of recording paper on touch-panel display 132, and then the control returns to step 404. Thereafter, if CPU 102 detects that appropriate recording paper is set in a tray, the control proceeds to step 408.

At step 408, CPU 102 determines recording paper on which the image is to be formed.

At step 410, CPU 102 determines whether or not the document read at step 400 corresponds to the size designated as an input image of the "input image priority display mode." Specifically, CPU 102 reads the information of input size of "input image priority display mode" stored in HDD 108 and compares the sizes of two sides (length and width) determined therefrom with the size (length and width) of read document. If it is determined that the document corresponds to the designated size, the control proceeds to step 412. Otherwise, the control proceeds to step 414, at which CPU 102 displays a preview image of the document scanned at step 402 on touch-panel display 132 in accordance with the orientation of recording paper determined at step 408 in the conventional manner and, thereafter, the control proceeds to step 416. Here, a legal size or letter size document is copied and, therefore, it is determined to correspond to the input image of "input image priority display mode" and, therefore, the control proceeds to step 412. The situation "the document corresponds to the designated size" is not limited to where the two matches but includes a situation where the difference between the length and width of the document determined at step 402 and the length and width set for the input image of the "input image priority display mode" is within a prescribed tolerance range (for example, within 5 mm or 2%). The tolerance for the length may be different from that of the width.

At step 412, CPU 102 displays a preview image in accordance with the document scanned at step 402 on touch-panel display 132. Specifically, it displays a preview image in the orientation set by the input image of "input image priority display mode." Here, the settings as shown in FIG. 9 are assumed and, therefore, a preview image in landscape orientation is displayed for a letter size document. A preview image in portrait orientation is displayed for a legal size document.

Figure 11:
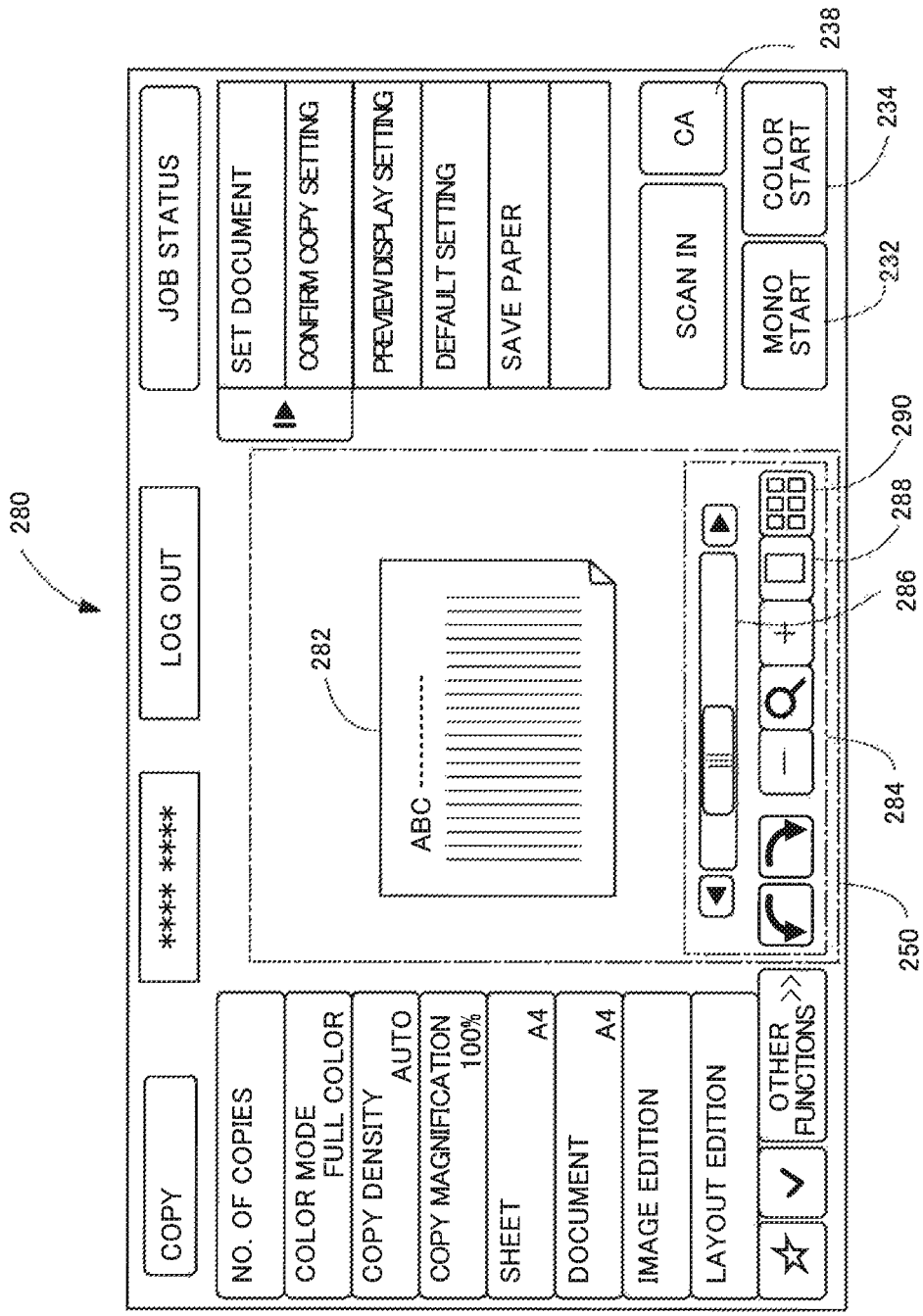
FIG. 11 shows a preview display on the image forming apparatus shown in FIG. 5.

By way of example, a preview image 282 such as shown in FIG. 11 is displayed. Preview image 282 represents a preview image displayed when preview conditions are set as shown in FIG. 9 and a letter size document is scanned. In FIG. 11, in a preview operation area 284 below the preview image, keys for operating the preview image are displayed. A slide bar 286 is displayed when a plurality of documents are scanned. When a plurality of documents are scanned, a plurality of preview images are generated and, when one preview image is displayed on preview area 250, slide bar 286 is operated to display another preview image. A single display key 288 is for displaying only one preview image on preview area 250. A multi-display key 290 is for displaying a plurality of preview images at one time on preview area 250.

At step 416, CPU 102 determines whether or not any key operation (touching of any key) has been done, Step 416 is repeated until it is determined that a key operation is done. If it is determined that a key operation is done, the control proceeds to step 418.

At step 418, CPU 102 determines if the touched key is a key instructing execution of copying, that is, if it is monochrome start key 232 or color start key 234. If it is determined to be monochrome start key 232 or color start key 234, the control proceeds to step 420, and copy is executed. Specifically, CPU 102 controls the conveying mechanism of paper feed unit 140 such that designated recording paper is picked-up from a tray and fed to image forming unit 120 and the image read at step 402 is formed on the fed recording paper. Thereafter, the control returns to step 400, the preview image is erased and screen image 200 (FIG. 8) is displayed, on touch-panel display 132.

At step 418, if it is not determined to be a key for instructing execution of copying, the flow proceeds to step 422, at which CPU 102 executes a designated process and the control proceeds to step 424. By way of example, if a copy number key, a color mode key, a copy density key or the like on function selecting area 220 is touched, CPU 102 displays a setting screen image corresponding to each key on touch-panel display 132 and receives setting by the touching operation of the user. When the setting ends, CPU 102 erases the setting screen image and displays screen image 280 (FIG. 11), and the control proceeds to step 424.

At step 424, CPU 102 determines whether or not cancellation is done, that is, whether or not clear all key 238 is touched. If it is determined that cancellation is done, the control returns to step 400. Otherwise, the control returns to step 418.

Through the foregoing, the preview image in accordance with the setting of preview display mode can be displayed. Specifically, if the preview display mode is set to the "selected sheet priority display mode," a preview image corresponding to the recording paper is displayed. If the preview display mode is set to the "input image priority display mode" and the "input image priority display mode" is applicable to the scanned document, a preview image corresponding to the document is displayed. Even if the "input image priority display mode" is set, a preview image corresponding to the orientation of recording paper is displayed if the "input image priority display mode" is not applicable to the scanned document.

Figure 3:
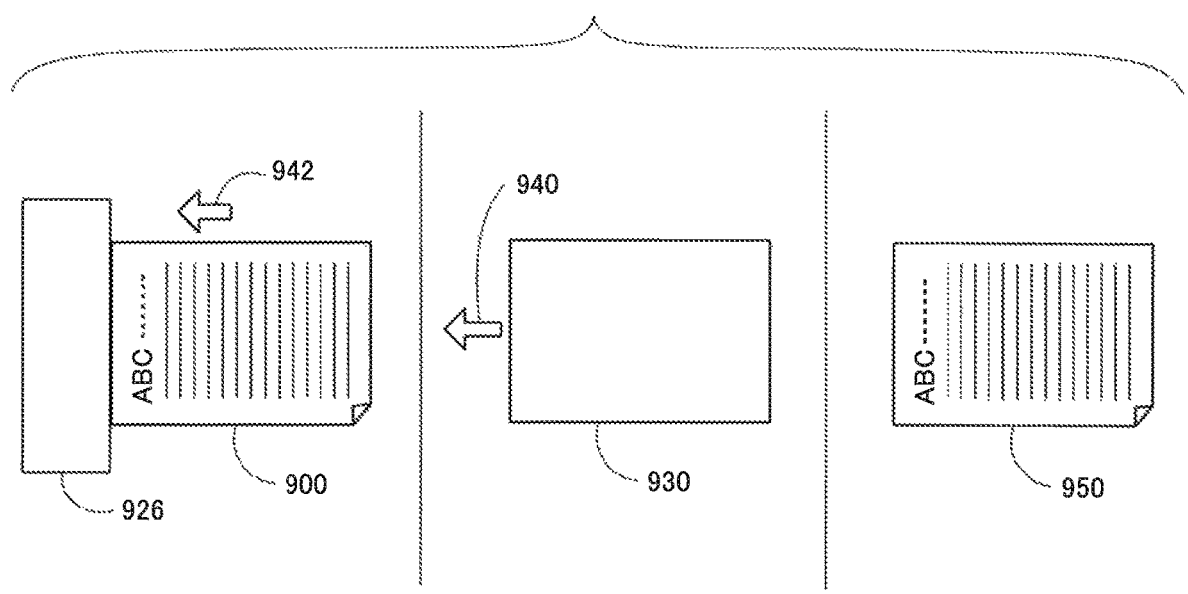
FIG. 3 shows a relation between each of the direction of setting a document, the direction of recording paper and the direction of preview image, when a legal size document is to be copied.

FIG. 12 shows a specific example of scanning a letter size document. In FIG. 12, meanings of the images on the left end, at the center and on the right end are the same as those of FIGS. 3 and 4. The directions of feeding the document and recording paper are also the same as in FIGS. 3 and 4. In FIG. 12, Examples No. 1 to No. 4 correspond to four different combinations of the direction of setting a letter size document at ADF 112 and the direction of arranging letter size recording paper. In any of these combinations, a preview image 282 is displayed in landscape orientation, Different from FIG. 4 showing a conventional example, in Examples No. 2 and No. 4 also, preview image 282 is displayed corresponding to the document orientation. In this manner, a preview image of a letter size document can always be displayed in landscape orientation (the direction set as the display condition), regardless of the orientation of the document set at ADF 112 or the direction of recording paper set in the tray. Since approximately 80% of letter size documents are used in landscape orientation (see FIG. 1), the user can easily confirm the finish. The same applies to the legal size documents. A preview image of a legal size document can always be displayed in portrait orientation (the direction set as the display condition) (preview image 950 of legal size shown on the right end of FIG. 3 is displayed in portrait orientation). Since approximately 80% of legal size documents are used in portrait orientation (see FIG. 1), the user can easily confirm the finish.

Figure 13:
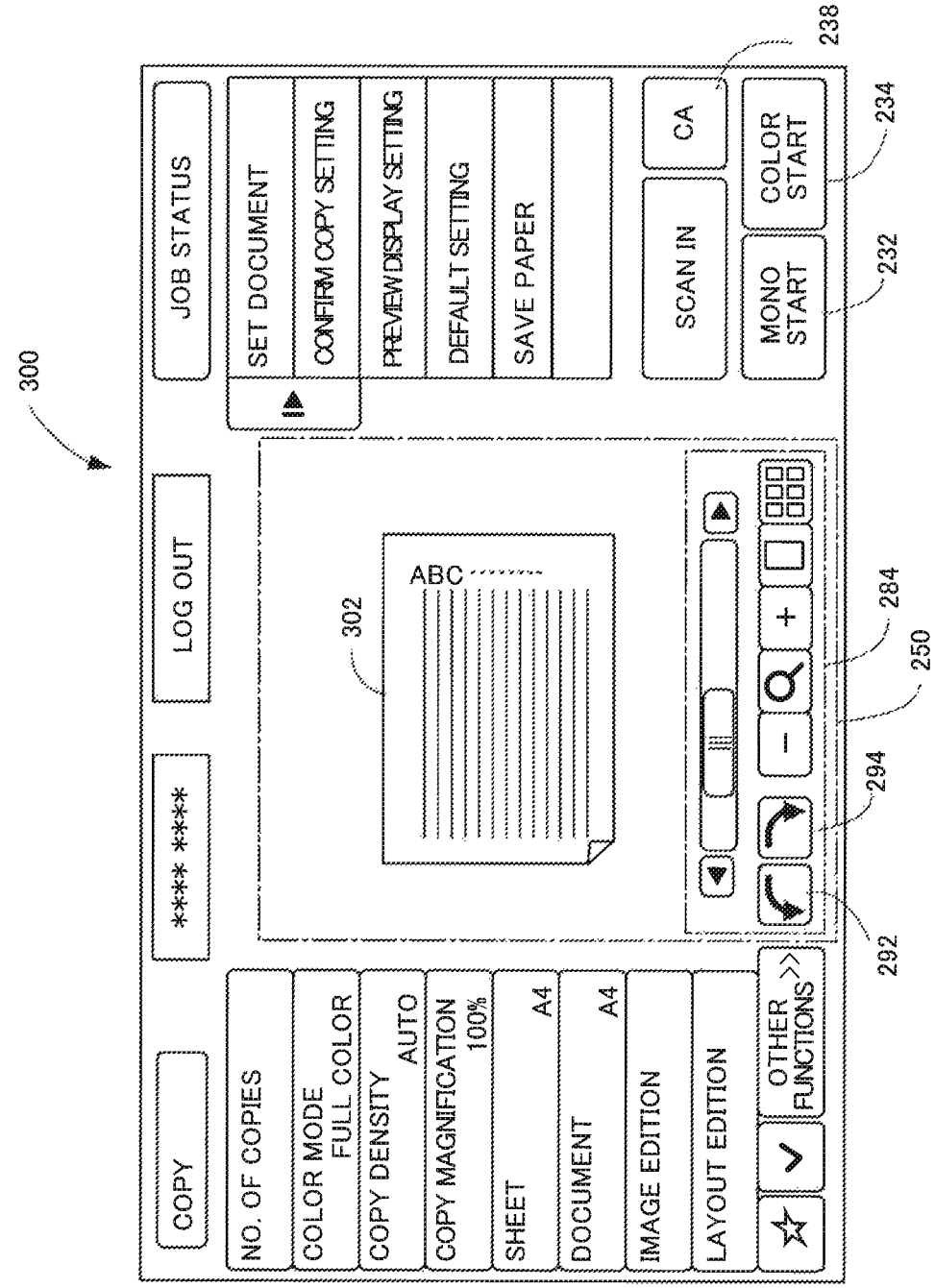
FIG. 13 shows a screen image of a preview image of a document in portrait orientation displayed in landscape orientation.
Figure 14:
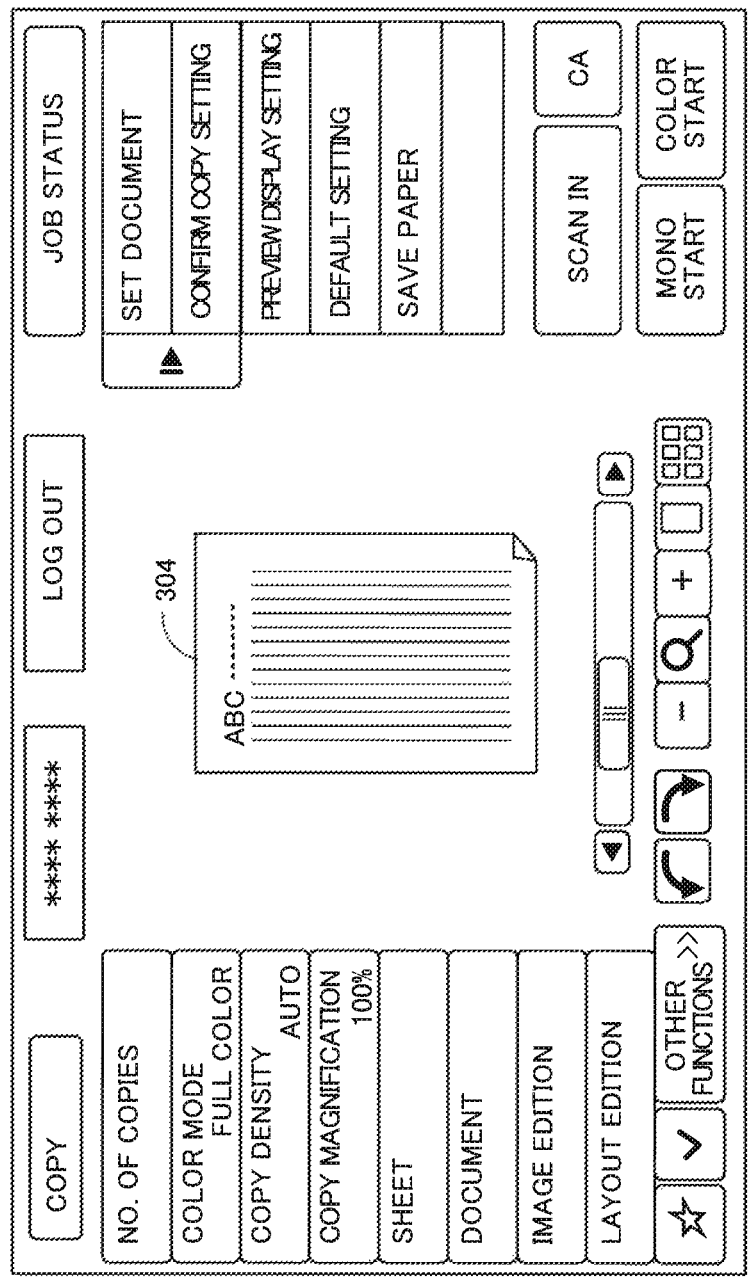
FIG. 14 shows a screen image having the preview image of FIG. 14 rotated by 90°.

Though approximately 80% of letter size documents or legal size documents are in certain orientation, remaining documents are in a different orientation. FIG. 13 shows a screen image 300 displayed when a letter size document is scanned with the same settings as in FIG. 9 and a preview image 302 is displayed. Since the document is of the letter size, preview image 302 is displayed as an image of landscape orientation. From preview image 302, it can be seen that the scanned document is in portrait orientation. In this state, it is difficult to confirm the expected finish. Here, by touching a left-turn key 292 on preview operation area 284, CPU 102 detects the touching and rotates preview image 302 by 90°, and displays the result as a preview image 304 as shown in FIG. 14. Thus, preview image 304 comes to be in the same portrait orientation as the document is formed, and the user can easily confirm the finish.

In FIG. 13, by once touching left-turn key 292, preview image 302 is rotated by 90° to the left and by twice touching left-turn key 292, preview image 302 is rotated by 180° to the left. A right-turn key 294 is for the process similar to that of left-turn key 292 except that the direction of rotation is opposite. It is also possible to use a gesture operation to rotate the preview image. By way of example, by putting one's finger on preview image 302 and turning the finger to a prescribed angle (for example, 90° or) 180° in counterclockwise direction to draw an ark, the preview image may be rotated to the left by the same angle. The right turn by a gesture operation is similar.

Though an example of scanning a letter size document in portrait orientation is shown in FIGS. 13 and 14, the process is similar when a legal size document in landscape orientation is scanned. Specifically, in that case, a preview image is displayed as an image in portrait orientation, and hence, the preview image shows a legal size document in landscape orientation rotated by 90°. Since it is difficult in this state to confirm the expected finish, the preview image is rotated to correspond to the orientation of formed document by using left-turn key 292 or right-turn key 294 in the similar manner as described above.

If a plurality of documents are scanned and the documents are all of the same size, it is possible to display all preview images in the same orientation by repeating steps 402 to 414 described above. For instance, if all documents are of the letter size, all preview images are displayed in landscape orientation as shown in FIG. 12. If all documents are of the legal size, all preview images are displayed in portrait orientation. Even when documents of different sizes are mixed, with the settings shown in FIG. 9, preview images in landscape orientation are displayed thr letter size documents and preview images in portrait orientation are displayed for legal size documents. For other documents, preview images are displayed in accordance with the direction of recording paper. If the orientation of preview image is different from that of the document formed, the preview image may be rotated to correspond to the document orientation, using left-turn key 292 or right-turn key 294 in the similar manner as described above.

It is also possible that the "input image priority display mode" is set to be applied only to the letter size documents so as to have the preview images displayed in landscape orientation. If a plurality of documents of letter size and legal size mixed are scanned in this state, previews are displayed as shown in FIG. 15. In FIG. 15, meanings of the images on the left end, at the center (two columns) and on the right end are the same as those of FIGS. 3, 4 and 12. The directions of feeding the document and recording paper are also the same as in FIGS. 3, 4 and 12. It is noted, however, that the left end column of FIG. 15 shows six documents of different sizes mixed, set collectively at ADF 112. Since sheets of letter size and legal size recording paper are set in different trays, two columns are used for indicating the recording paper. Here, it is assumed that the sheets of recording paper are set as shown in FIG. 8 (sheets of letter size recording paper are set in different directions in the first and second trays), and the sheets of recording paper (8.5×11) in the first tray are set to be used for letter size documents. A blank cell means that the corresponding recording paper is not used. As can be seen from FIG. 15, preview images of letter size documents are always displayed as images in landscape orientation, regardless of the orientation of the document set at ADF 112 or the direction of recording paper set in the tray. Since the "input image priority display mode" is not set to be applied to legal size documents, preview images thereof are displayed in landscape orientation (right end of Nos. 2 and 6) in accordance with the direction of recording paper.

Figure 16:
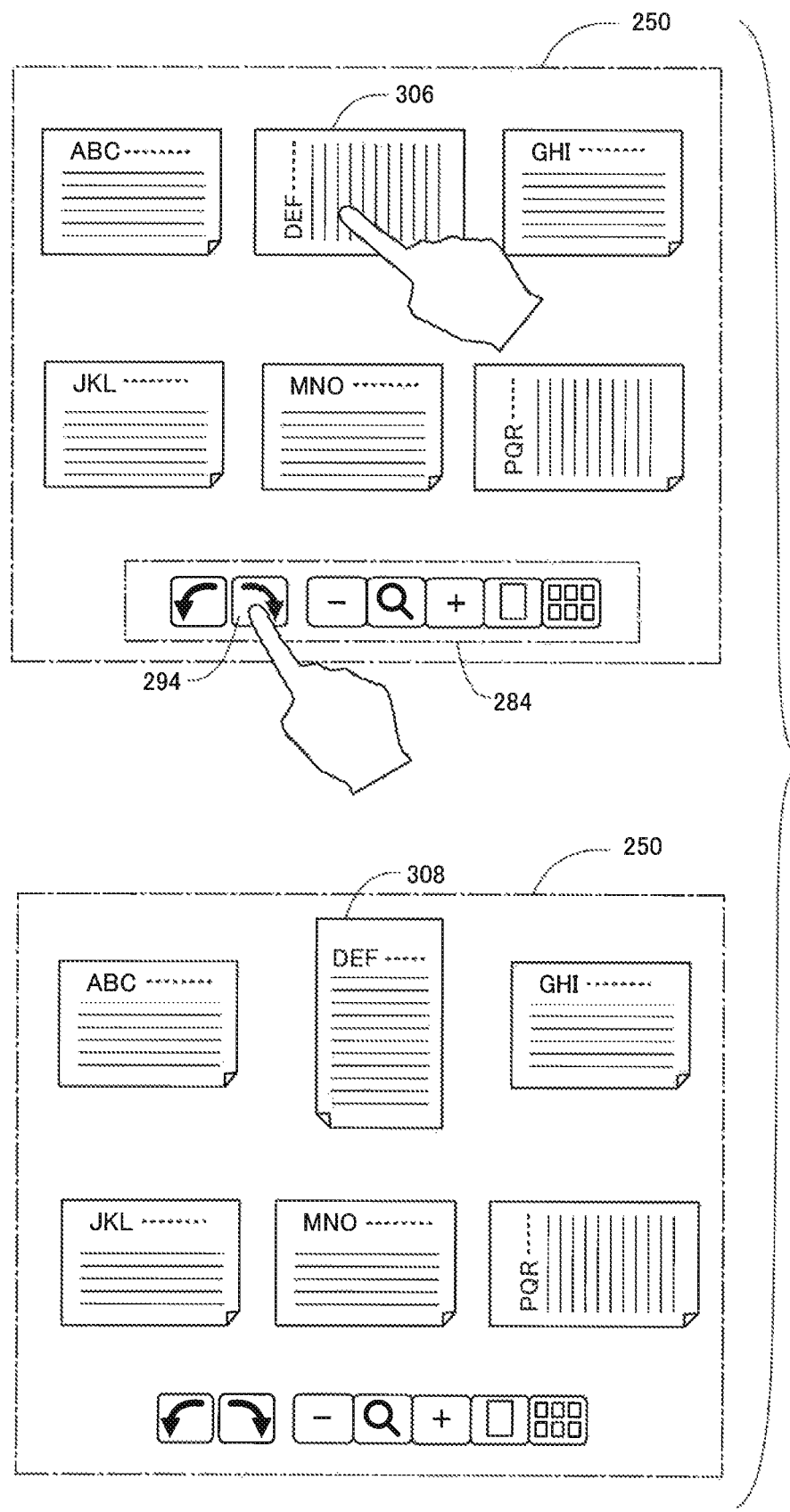
FIG. 16 shows an operation of rotating one preview image by 90°.

A process of rotating a preview image in the example such as shown in FIG. 15 will be specifically described. FIG. 16 shows preview area 250 of touch-panel display 132 corresponding to FIG. 15. On the upper half of FIG. 16, the same six preview images as FIG. 15 are displayed in multi-display. The upper left image is the preview image of No. 1 and the lower right one is the preview image of No. 6. On the display of upper half of FIG. 16, when the user touches a preview image 306 (legal size document No. 2 of FIG. 15) to select preview image 306 as an object of processing and then touches right-turn key 294, CPU 102 detects the touching and displays a preview image 308, which results from rotation of 90° to the right of selected preview image 306, as shown on the lower half of FIG. 16.

Figure 17:
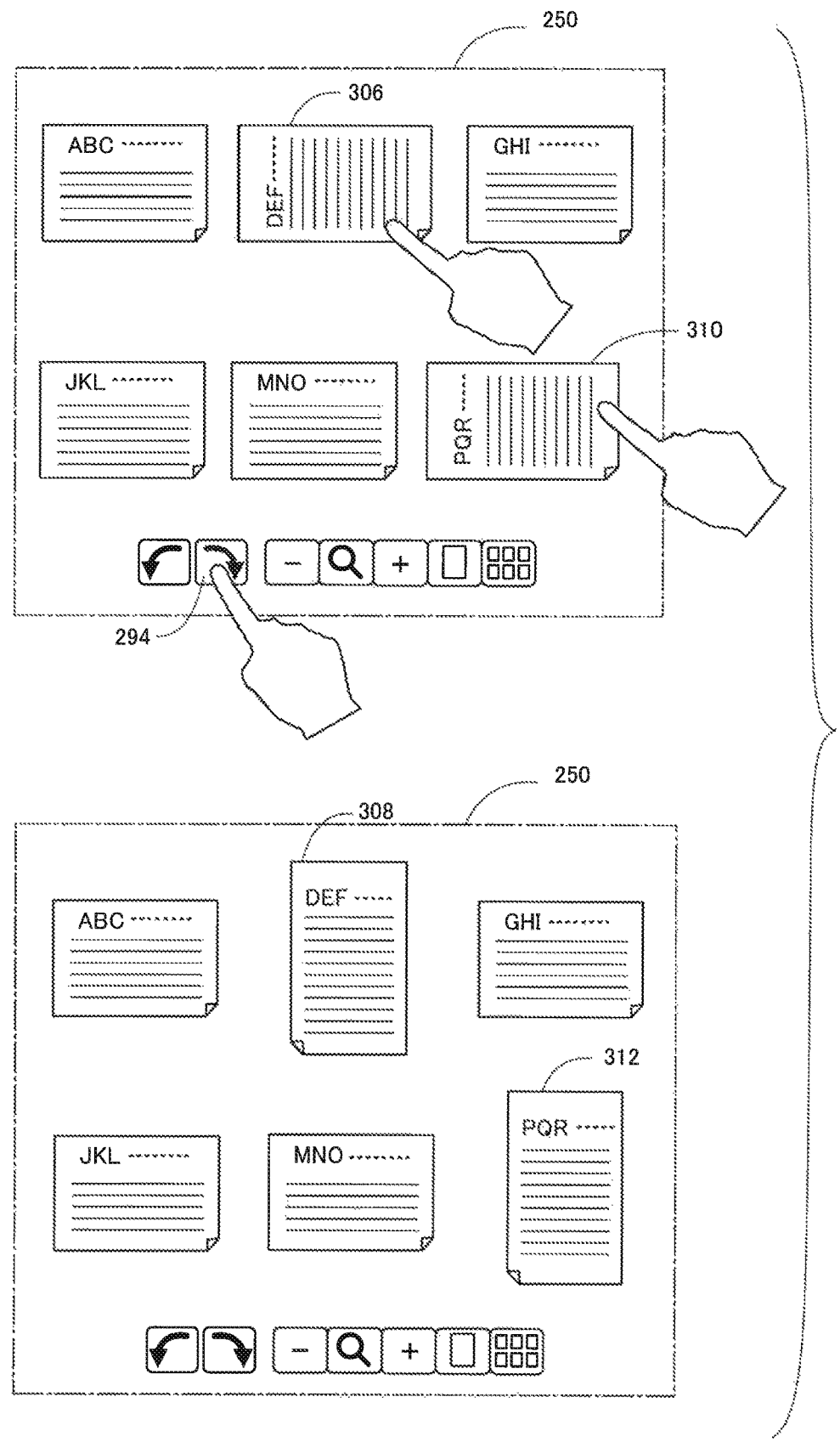
FIG. 17 shows an operation of rotating a plurality of preview images by 90° at one time.

Alternatively, a plurality of preview images may be selected and the rotating process may be executed collectively at one time. By way of example, referring to the upper half of FIG. 17, when the user touches preview images 306 and 310 (legal size documents No. 2 and No, 6 of FIG. 15) to select preview images 306 and 310 as objects of processing and then touches right-turn key 294, CPU 102 detects the touching and displays preview images 308 and 312, which result from rotation of 90° to the right of selected preview images 306 and 310, as shown on the lower half of FIG. 17.

The multi-display of displaying a plurality of preview images on touch-panel display 312 is not limited to the above. By way of example, not all the preview images may be displayed at one time. Only a part (two or three) of the preview images may be displayed at one time, and slide bar 286 shown in FIG. 13 may be used to display remaining preview images. In that ease also, the rotating operation described above can be realized by selecting a displayed preview while operating slide bar 286.

Further, the operation of selecting a plurality of preview images and collectively rotating them at one time is not limited to the above, either. For instance, an approach may be possible in which by selecting one preview image and instructing rotation to the left/right while a set of preview images of a plurality of continuously read documents are displayed, all preview images of documents having the same size as the selected preview image are rotated by the same angle in the same direction. Such an approach is efficient since the trouble of selecting preview images as the objects of operation one by one can be saved, and operation errors can be reduced.

Further, the documents of which preview images are displayed in designated directions are not limited to the letter size and legal size documents. If documents of a different size are frequently used in a certain orientation, the "input image priority display mode" may be applied to the documents of that size, to have the preview images displayed in accordance with the frequently used orientation of the documents.

Though an example having an automatic document feeder (ADF) has been described above, it is not limiting. In an image forming apparatus not provided with an ADF, a glass platen for placing a document to be scanned has limitations similar to a document tray, to prevent increase in size and cost of the image forming apparatus. Specifically, a letter size document can be arranged in each of lengthwise and widthwise directions, whereas a relatively large document such as a legal size one can be arranged in only widthwise direction. Therefore, here again, the above-described problem of preview display arises, which can be solved by the present invention.

Though an image immediately after scanning has been described as a preview image in the foregoing, if a post processing such as punching or stapling sheets of recording paper having images formed thereon is set, an image representing the recording paper after such a process may be displayed as the preview image.

As described above, the image forming apparatus includes: an image input unit allowing input of image data generated from a read document; a paper feed unit containing recording paper to be fed for image formation; an image forming unit forming an output image based on the image data on the recording paper fed from the paper feed unit; a preview image generating unit generating a preview image representing an expected state of the recording paper when the output image is formed, from the image data; and a display unit displaying the preview image. The display unit displays the preview image in a first display mode of displaying the preview image in accordance with size and orientation of recording paper fed from the paper feed unit for forming the output image, or in a second display mode of displaying the preview image in accordance with size of the read document.

Preferably, the display unit displays a preview image in a first display mode in the initial state of the image forming apparatus and, if a prescribed condition is designated and the condition is satisfied, it displays a preview image in the second display mode.

More preferably, the image input unit includes a feeding unit for feeding a document to a reading position, and at the reading position, the image input unit reads the document and generates image data.

More preferably, as the condition for the display unit to display the preview image in the second display mode, a document size is designated.

Preferably, if a plurality of different sizes of documents are designated as the condition for the display unit to display the preview image in the second display mode, and image data of a plurality of documents including documents of different sizes are input to the image input unit, then, the display unit displays a preview image of a document corresponding to any one of the plurality of designated sizes in the second display mode.

More preferably, the image forming apparatus further includes an operation unit causing a displayed preview image to be displayed rotated in a prescribed direction.

More preferably, the image forming apparatus is configured such that while image data of a plurality of documents including documents of different sizes are input and a plurality of preview images are displayed, if a plurality of preview images are selected from the displayed plurality of preview images and an instruction to rotate these in a prescribed direction by a prescribed angle is made through the operation unit, the plurality of selected preview images are displayed rotated in a prescribed direction by a prescribed angle.

Preferably, the image forming apparatus further includes a switch unit for switching between the first and second display modes.

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The present invention provides an image forming apparatus capable of displaying a preview image in a prescribed direction, regardless of the direction of arrangement of recording paper in a tray with respect to a document of a prescribed size, enabling smooth confirmation of contents of output image by the user.

REFERENCE SIGNS LIST

100 image forming apparatus
102 control unit (CPU)
104 ROM
106 RAM
108 HDD
110 document reading unit 112 ADF
114 bus
120 image forming unit
122 image processing unit
124 image memory
130 operation unit
132 touch-panel display
134 operation key unit
140 paper feed unit
142 manual feed tray
150 discharging unit
152 paper discharge tray
160 NIC
162 network

The invention claimed is:

1. An image forming apparatus, comprising:
a document reader that inputs image data generated by reading a document;
a paper feeder including recording paper to be fed for image formation;
an image printer that forms an output image based on said image data on said recording paper fed from said paper feeder;
an operation panel including a display and at least one operation key; and
a processor that generates a preview image representing an expected state of said recording paper when said output image is formed, from said image data; wherein
the display displays said preview image in a preset display direction;
the at least one operation key sets said preset display direction based on a user input;
the preset display direction is set by the user input designating a size of said document;
the preset display direction is set in response to the user input before said document has been read by the document reader;
the preview image displayed in the preset display direction is displayed in a preview display area in one of a single display mode and a multi-display mode;
the single display mode and the multi-display mode are selectively switchable to each other;
in the multi-display mode, the display displays a plurality of preview images;
the plurality of preview images are selectively rotatable; and
in the multi-display mode, the plurality of preview images do not overlap one another, regardless of a rotation of each of the plurality of preview images; and
in the multi-display mode, in response to a selection of one preview image and to an instruction to rotate the selected one preview image, the display rotates and displays only the selected one preview mage and a preview image having a same size as the selected one preview image.

2. The image forming apparatus according to claim 1, wherein
the document reader includes a document detection sensor that detects a size of said document,
said display displays said preview image in a first display mode displaying said preview image in accordance with a size and orientation of recording paper fed from said paper feeder to form said output image if said size of said document detected by said document detection sensor does not fall within a prescribed size, and
said display displays said preview image in a second display mode displaying said preview image in the display direction set before reading said document if said size of said document detected by said document detection sensor falls within said prescribed size.

3. The image forming apparatus according to claim 2, wherein
said document reader reads said document and generates said image data;
said document detection sensor detects length and width of said document read by said document reader;
said prescribed size is a first value or a second value not larger than said first value; and
said display displays said preview image in said second display mode if difference between said length and said first value and difference between said width and said second value are within a prescribed range, and displays said preview image in said first display mode if at least one of the difference between said length and said first value and the difference between said width and said second value exceeds said prescribed range.

4. The image forming apparatus according to claim 1, wherein:
in response to a setting through the operation panel to execute an additional process that is punching or stapling of the recording paper on which the output image is formed:
the processor generates a preview image representing the recording paper in a state after execution of the additional process, and
the display displays the preview image representing the recording paper in a state after execution of the additional process.

5. The image forming apparatus according to claim 1, wherein in response to reading of a plurality of documents of different sizes by the document reader, the display displays a preview image of each of the plurality of documents in the preset display direction corresponding to a size of the each of the plurality of documents.

6. An image forming apparatus receiving an input image data generated by reading a document and displaying a preview image representing an expected state of recording paper when an output image based on said image data is formed on said recording paper, wherein
if said image data is generated by reading said document of a prescribed size, said preview image is displayed in a preset display direction that has been set by an operation of an operation key of the image forming apparatus by a user before said document has been read by a document reader;
if said image data is generated by reading said document of a size other than said prescribed size, said preview image is displayed in accordance with a size and orientation of recording paper for forming said output image; and
the preset display direction is set by the user designating a size of said document;
the preview image displayed in the preset display direction is displayed in a preview display area in one of a single display mode and a multi-display mode;
the single display mode and the multi-display mode are selectively switchable to each other;
in the multi-display mode, the display displays a plurality of preview images;
the plurality of preview images are selectively rotatable;
in the multi-display mode, the plurality of preview images do not overlap one another, regardless of a rotation of each of the plurality of preview images;

in the multi-display mode, in response to a selection of one preview image and to an instruction to rotate the selected one preview image, the display rotates and displays only the selected one preview image and a preview image having a same size as the selected one preview image.

7. A method of controlling an image forming apparatus including a paper feeder including recording paper to be fed for image formation, comprising the steps of:

inputting image data generated by reading a document;

forming an output image based on said image data on said recording paper fed from said paper feeder;

generating a preview image representing an expected state of said recording paper when said output image is formed, from said image data;

displaying said preview image in a preset display direction; and receiving a setting of said preset display direction based on a user input; wherein the preset display direction is set by the user input designating a size of said document;

the preset display direction is set by the setting received in response to the user input before reading said document to generate the image data;

the preview image displayed in the preset display direction is displayed in a preview display area in one of a single display mode and a multi-display mode;

the single display mode and the multi-display mode are selectively switchable to each other;

in the multi-display mode, the display displays a plurality of preview images;

the plurality of preview images are selectively rotatable;

in the multi-display mode, the plurality of preview images do not overlap one another, regardless of a rotation of each of the plurality of preview images; and in the multi-display mode, in response to a selection of one preview image and to an instruction to rotate the selected one preview image, the display rotates and displays only the selected one preview image and a preview image having a same size as the selected one preview image.

* * * * *